United States Patent Office

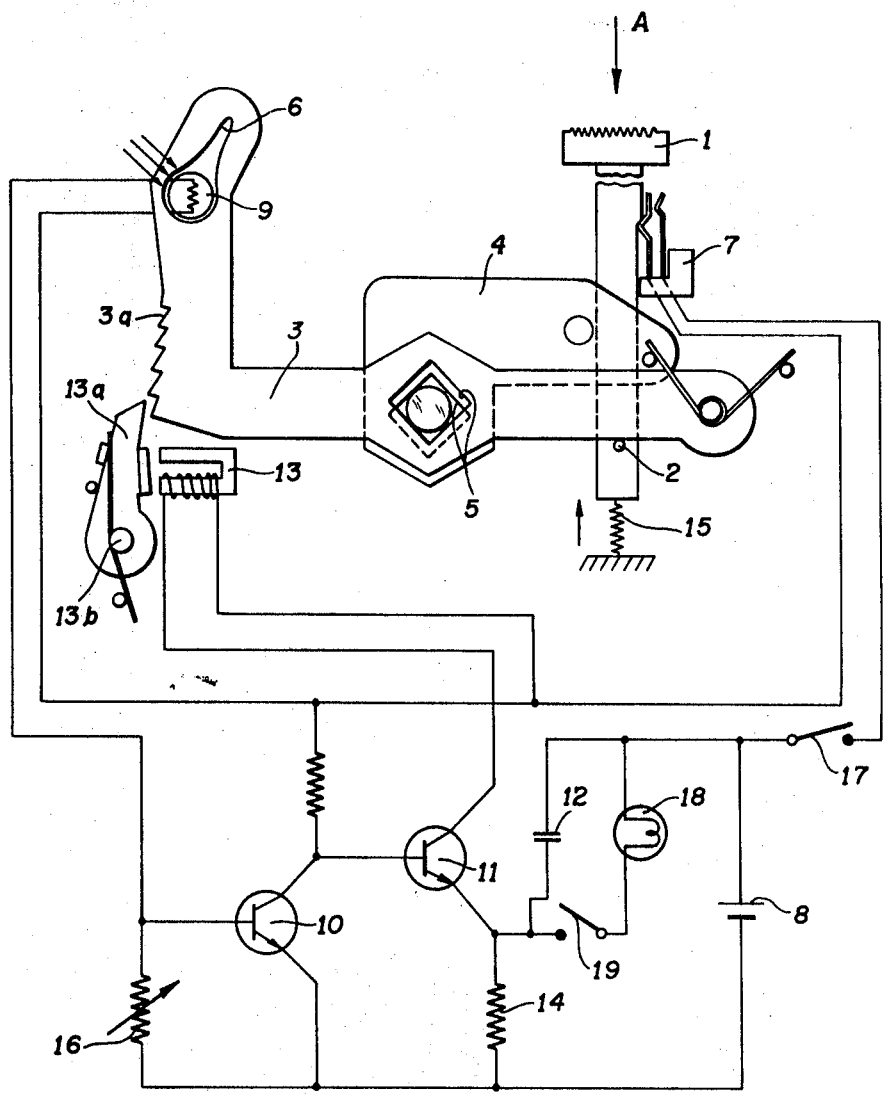

3,605,588
Patented Sept. 20, 1971

3,605,588
PHOTOGRAPHIC CAMERA WITH ELECTRONICALLY CONTROLLED LENS DIAPHRAGM
Wolfgang Ort, Stuttgart-Bad Cannstatt, and Clemens Höpfner, Stuttgart-Wanger, Germany, assignors to Eastman Kodak Company, Rochester, N.Y.
Filed Nov. 29, 1968, Ser. No. 779,945
Claims priority, application Germany, June 25, 1968,
P 17 72 718.3
Int. Cl. G03b 7/08, 9/06
U.S. Cl. 95—10    3 Claims

ABSTRACT OF THE DISCLOSURE

In order to minimize the size of the power supply for an electromagnetic exposure control, the pull-in solenoid current is supplied by a capacitor, while the holding current, which is substantially less than the pull-in current, is supplied conventionally.

BACKGROUND OF THE INVENTION

Field of the invention

The present invention relates to a photographic camera with an electronically controlled lens diaphragm and a mechanically controlled shutter.

Description of the prior art

Such diaphragm control devices comprising holding magnet blocking means are known from a great number of embodiments. The diaphragm usually is controlled by a photocell acting directly or through electronic amplifying and/or switching circuitry in response to scene brightness.

To achieve the desired degree of response, the necessary accuracy of the switching means, and a cost saving, robust arrangement, modern components such as a photoresistor, electronic threshold switch, or threshold amplifier circuit are used because of limited space. Electromagnets are used as driving components, i.e., for producing mechanical forces.

An electromagnet places a considerable strain on the battery because of its high current consumption. In order to obtain the highest possible initial forces, the resistance of the magnet coil winding is kept as low as possible. Considerably less force is necessary to hold the armature, however. Accordingly, the electromagnet functions to attract its armature when the electronic system has reached a threshold value and to hold the armature until the shutter action is completed. During this time the battery, whose capacity is limited by the restricted space in the camera body, is stressed to such an extent that its useful life is short. It is therefore necessary to replace the battery too often.

SUMMARY OF THE INVENTION

For this reason it is the object of the invention to avoid the above-mentioned shortcomings and to make it possible to use a capacitance for moving the armature so that the high current necessary for moving the armature is supplied by the capacitance, and only the current necessary for holding the armature is drawn from the battery.

In a preferred embodiment of the invention, this problem is solved in a camera of the type described above which, when set for daylight operation, an electronic switching amplifier controlled by a photoresistor switches an electromagnet which operates a mechanical blocking device. When a threshold value is reached, the diaphragm motion is stopped at an optimal position as a function of the light conditions prevailing at the moment the exposure is made. The illuminated area of the photoresistor varies synchronously with and according to the change in the lens diaphragm. The problem of the high battery loading is solved by exciting the electromagnet with a capacitor connected in parallel with the collector circuit of the output transistor. The capacitor discharges through the output transistor when it goes into conduction so that the resulting current pulse acts on the electromagnet, which is connected in series with the emitter-collector path of the transistor.

This design permits the magnet coil winding to have a very low resistance without overloading the battery since the energy stored in the capacitor is used to move the armature. It is therefore possible to obtain high initial forces of approximately equal value upon each release action.

In a preferred embodiment of the invention, the capacitor can be selectively used for flash operation by a simple change in the circuit.

BRIEF DESCRIPTION OF THE DRAWING

The invention will be better understood when the following specification is read with the drawing in which:

The sole figure shows a partially schematic, partially diagrammatic view of a preferred embodiment.

DESCRIPTION OF THE PREFERRED EMBODIMENT

The mode of operation of the embodiment as well as further details of the invention appear from the following description.

Referring to FIG. 1, there is shown a member 3 which establishes both a diaphragm opening 5 and a photocell opening 6. Also shown is a member 4 which operates synchronously with member 3 to variably establish the diaphragm opening 5.

An armature-catch 13a is mounted for movement into engagement with teeth 3a to block further motion of the member 3. Armature 13a is actuated by an electromagnet 13 which is connected to the appropriate energizing circuitry described below.

If the release member 1 of the camera is depressed in the direction of arrow A the return rivet 2 releases the members 3 and 4 so that they can move apart from the maximum aperture position to close the diaphragm opening 5. Simultaneously with closing of the lens diaphragm opening 5, photocell opening 6 in front of the photoresistor 9 closes.

During the lost motion preceding the shutter release, the main switch 7 is closed, thereby connecting the electric circuitry to the battery 8. As soon as the photoresistor 9 has reached a value of resistance corresponding to scene brightness, the two-stage transistor circuit is brought into conducting position in a way known in the art, i.e., the transistor 10 blocks while transistor 11 goes into conduction. The capacitor 12 thus discharges through the emitter-collector circuit of transistor 11 and through electromagnet 13. Consequently, the armature catch 13a of said electromagnet is attracted and moves to engage one of the teeth 3a of blade 3. Thus, the movement of the diaphragm is stopped.

Emitter resistor 14 serves three purposes. Besides being the emitter resistor for transistor 11, resistor 14 is a series resistor to provide the recharging of capacitor 12 when the camera is in rest position, and it also determines the magnitude of the holding current, after the discharge current of the capacitor 12 has attracted the armature 13a.

If it is desired that armature 13a be self-locking, the geometric arrangement of the center of rotation 13b of the armature relative to the toothing 3a can be adjusted, and/or the form of the toothing itself can be adjusted.

After the setting of the aperture, the shutter mechanism (not shown) is released by release member 1. Thereafter all mechanical parts return to their initial position by virtue of the return spring 15 upon release of member 1. Switch 7 simultaneously opens again and disconnects the electronic circuit from battery 8. The capacitor 12 remains connected to battery 8 and recharges until the next release action takes place.

Variable resistor 16 is connected in series with the battery and the photoresistor 9 to provide an input potential divider for the electronic switching amplifier; it is provided to adjust the threshold value at which the switch circuit is triggered whereby the electromagnet 13 is to attract armature 13a.

When the camera is set for flash operations by appropriate means, e.g., by adjusting the symbol selection ring or by inserting a flashlamp in the built-in socket of the camera (not shown), the aperture is defined, e.g., by distance setting. This is well known in the art and is therefore not shown. It is, however, important that in this case the electronic system is not needed and consequently disconnected from the current source 8 by an additional switch 17. The closing of switch 7 caused by the release member 1 is thus made ineffective.

The flashlamp 18 is fired by closing the synchronized switch 19 causing the capacitor 12 to be discharged through the flashlamp.

The invention has been described in detail with particular reference to a preferred embodiment thereof, but it will be understood that variations and modifications can be effected within the spirit and scope of the invention.

We claim:

1. In a camera having an electromagnetic exposure control means connectable with a source of electric potential for selective energization of an electromagnet to move an armature from a rest position to an actuated position in response to a first magnitude of current flow through the electromagnet and to hold the armature in its actuated position in response to a second lesser magnitude of current flow through the electromagnet, the improvement comprising:
   (a) a capacitance;
   (b) switch means for selectively connecting said electromagnet in parallel with said capacitance, the magnitude of said capacitance, the resistance of the electromagnet and the potential of said source being proportioned so that discharge of said capacitance through said electromagnet establishes a current of at least said first magnitude to flow through said electromagnet to thereby move said armature from its rest position to its actuated position; and
   (c) a resistor connected in series with capacitance to limit both the peak charging current of said capacitance and the holding current of said electromagnet, said resistance means having a resistance value that establishes a current flow of at least said second magnitude through the electromagnet from the potential source.

2. In a camera having diaphragm means for establishing an exposure aperture including a member movable along a path to vary the size of the exposure aperture, an electromechanical exposure control energizable by a battery comprising:
   (a) photoresponsive means adapted to receive illumination from an object scene and having an electrical parameter which varies as a function of the level of scene illumination incident thereon;
   (b) an electromechanical transducer including an armature and an electromagnet energizable to move the armature from a rest position to an actuated position to adjust the position of the diaphragm member along its path to establish the size of the exposure aperture in response to a first magnitude of current flow through the electromagnet, and for holding the armature in its actuated position in response to a second lesser magnitude of current flow through the electromagnet;
   (c) means movable for variably attenuating the scene illumination incident on said photoresponsive means;
   (d) means coupling said attenuating means with said diaphragm member for simultaneous movement therewith;
   (e) electric circuit means operably coupled to said photoresponsive means and said electromagnet for controlling the energization of said electromagnet, said circuit means including a capacitance, switch means for selectively connecting said electromagnet in parallel with said capacitance to produce a current flow of at least said first magnitude from said capacitance through said electromagnet to move said armature to its actuated position, said circuit means being adapted to activate said switch means to connect said electromagnet in parallel with said capacitance when the level of scene illumination incident on said photoresponsive means reaches a predetermined level, and resistance means connected in series with said capacitance to limit both the peak charging current of said capacitance and the holding current of said electromagnet, said resistance means having a resistance value that permits a current flow of at least said second magnitude from the battery through said electromagnet when said switch means is actuated.

3. In a camera having diaphragm means for establishing an exposure aperture including a member movable along a path to vary the size of the exposure aperture and means for receiving an electrically operable flash lamp on the camera, an electromechanical exposure control energizable by a battery comprising:
   (a) photoresponsive means adapted to receive illumination from an object scene and having an electrical parameter which varies as a function of the level of scene illumination incident thereon;
   (b) an electromechanical transducer including an armature and an electromagnet energizable to move the armature from a rest position to an actuated position to adjust the position of the diaphragm member along its path to establish the size of the exposure aperture in response to a first magnitude of current flow through the electromagnet, and for holding the armature in its actuated position in response to a second lesser magnitude of current flow through the electromagnet;
   (c) means movable for variably attenuating the scene illumination incident on said photoresponsive means;
   (d) means coupling said attenuating means with said diaphragm member for simultaneous movement therewith;
   (e) electric circuit means operably coupled to said photoresponsive means and said electromagnet for controlling the energization of said electromagnet, said circuit means including a capacitance, first switch means for selectively connecting said electromagnet in parallel with said capacitance to produce a current of said first magnitude from said capacitance through said electromagnet to move said armature to its actuated position, said circuit means being adapted to activate said switch means to connect said electromagnet in parallel with said capacitance when the level of scene illumination incident on said photoresponsive means reaches a predetermined level, and resistance means connected in series with said capacitance to limit both the peak charging current of said capacitance and the holding current of said electromagnet, said resistance means having a resistance value that permits a current flow of at least said second magnitude from the battery through the electromagnet when said first switch means is activated; and
   (f) second switch means for selectively connecting a flash lamp in said lamp receiving means in parallel with said capacitance to cause ignition of the flash lamp.

References Cited

UNITED STATES PATENTS

| | | | |
|---|---|---|---|
| 3,140,428 | 7/1964 | Shepard, Jr. | 317—151X |
| 3,158,791 | 11/1964 | Deneen, Jr. et al. | 317—151X |
| 3,231,787 | 1/1966 | Knudson | 317—148.5 |
| 3,292,515 | 12/1966 | Sato et al. | 95—64X |
| 3,397,629 | 8/1968 | Mori et al. | 95—10(C) |
| 3,433,138 | 3/1969 | Burgarella | 95—10(C) |
| 3,455,219 | 7/1969 | Burgarella | 95—10(C) |
| 3,466,447 | 9/1969 | Fahlenberg | 250—210 |
| 3,482,497 | 12/1969 | Ernisse | 95—10(C) |

JOHN M. HORAN, Primary Examiner

J. F. PETERS, JR., Assistant Examiner

U.S. Cl. X.R.

95—64; 250—210; 352—141